Dec. 3, 1940.     M. M. BRUBAKER ET AL     2,224,037
ESTER-AMIDE INTERPOLYMERS
Filed Sept. 30, 1938
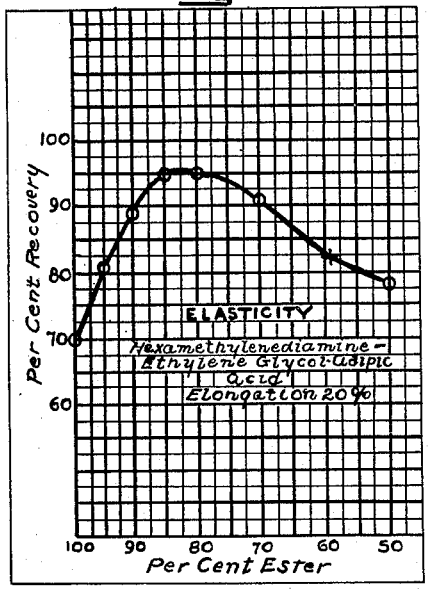
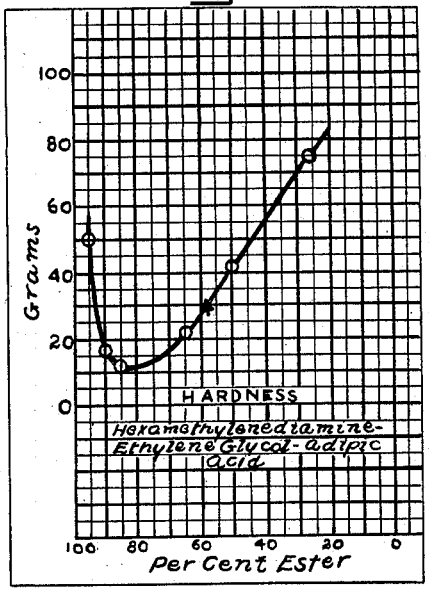
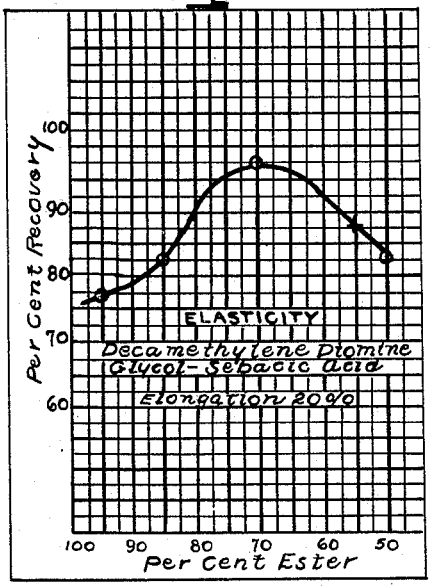
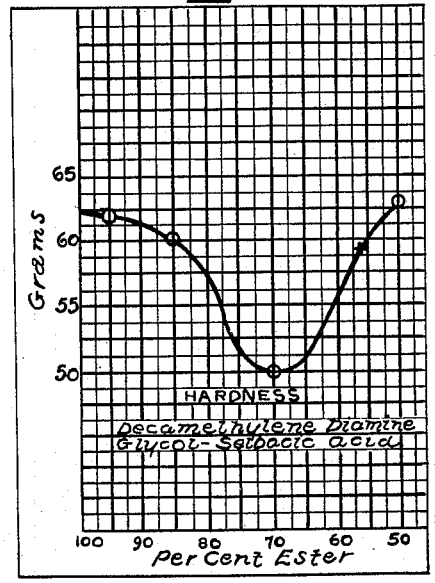
Inventors
Merlin Martin Brubaker,
Robert Edward Christ,
Donald Drake Coffman.
By R. F. Miller
Attorney Patented Dec. 3, 1940

2,224,037

UNITED STATES PATENT OFFICE 2,224,037

ESTER-AMIDE INTERPOLYMERS

Merlin Martin Brubaker, Robert Edward Christ, and Donald Drake Coffman, Wilmington, Del., assignors to E. I. du Pont de Nemours & Company, Wilmington, Del., a corporation of Delaware Application September 30, 1938, Serial No. 232,685

9 Claims. (Cl. 260—42)

This invention relates to polymeric materials and more particularly to fiber-forming linear polymers.

This invention has as an object the preparation of fiber-forming linear polymers characterized by new and valuable properties. A further object is the production of polymers of this kind which have greater solubility and greater stretchability than the fiber-forming polymers previously made. A further object resides in a simplified method for preparing these polymers. A still further object is the manufacture of new and improved articles from these polymers such as fibers, films, foils, coating compositions, safety-glass interlayers, and molded articles. Other objects will appear hereinafter.

These objects are accomplished by heating at reaction temperature a mixture of diamines, dibasic acids and glycols in such proportions that the ester-amide interpolymer obtained contains more than two ester groups for each amide group, and by continuing the heating until the polymer obtained is capable of being formed into continuous filaments.

The polymers of the present invention are of the type described in Patent 2,071,250 as synthetic linear condensation polymers. These polymers are obtained from bifunctional reactants and are high molecular weight products capable of being drawn into oriented fibers. The ester-amide interpolymers with which this invention is concerned, however, have not before been prepared with a higher ratio of ester to amide groups than 1:1. By means of the present invention in which this ratio of ester groups to amide groups is as a minimum more than doubled, products are obtained having properties markedly different from the mentioned previously made ester-amide interpolymers, and from either the straight ester or straight amide polymers.

The ester-amide interpolymers of this invention are conveniently prepared by a process involving as a first step heating under atmospheric pressure in the presence of water a diamine, a dibasic acid, and a glycol in such proportions that the final product has a ratio of ester groups to amide groups greater than 2:1. The quantity of dibasic acid used should be approximately chemically equivalent to the sum of the diamine and glycol used. During the preliminary heating period the water originally introduced to homogenize the reaction mixture and the water formed as a product of the condensation is removed by distillation. Agitation is conveniently obtained by allowing a stream of nitrogen to bubble slowly through the reaction mixture. The intermediate polymerizate so formed is then heated at a higher temperature under diminished pressure (e. g., 2 to 4 mm.) with a slow stream of nitrogen facilitating the removal of water until the product has a sufficiently high molecular weight to exhibit fiber-forming properties. The fiber-forming stage can be tested for by touching the molten polymer with a rod and drawing the rod away; if this stage has been reached, a continuous filament of considerable strength and pliability is formed. This stage is generally reached when the polyester-amide has an intrinsic viscosity of at least 0.4, where intrinsic viscosity is defined as $$\frac{\log_e n_r}{C}$$

in which $n_r$ is the viscosity of a dilute solution of the polymer in m-cresol divided by the viscosity of m-cresol in the same units and at the same temperature (e. g., 25° C.) and C is the concentration in grams of polymer per 100 cc. of solution. In general, measurement of the intrinsic viscosity is the most convenient method for following the course of the reaction to determine when the desired degree of polymerization has been obtained. It is desirable to continue the reaction until the intrinsic viscosity is considerably above 0.4, preferably until the intrinsic viscosity is above 0.6. The interpolymers of this invention do not acquire the properties desired for most uses until they possess fiber-forming and cold drawing properties. In other words, great strength, toughness, flexibility and elasticity go hand in hand with fiber-forming properties.

The products of the condensation, carried out as described above, are crystalline, linear polyesteramides possessing fiber-forming properties along with unexpected elasticity and rubberiness, and having enhanced solubilities as compared to straight fiber-forming polyesters or polyamides. On hydrolysis with hydrochloric acid, the ester-amide interpolymers revert to the reactants from which they were prepared. In other words, an interpolymer derived from a diamine, a dibasic acid and a glycol will yield on hydrolysis with hydrochloric acid a mixture comprising a diamine hydrochloride, a dibasic acid and a glycol.

The melting points of ester-amide interpolymers lie between and approach, with change in composition, those of the pure polyester or polyamide. The sharpness of the melting points and the X-ray diffraction patterns indicate that these interpolymers are crystalline, linear polymers rather than thermoplastic resins. In general, the compositions high in ester content in each series are soluble in a large variety of solvents such as alcohols, esters and ketones, whereas those low in ester content are soluble only in the usual polyamide solvents such as phenol and formic acid.

In the linear polyester-amides of this invention, which comprise essentially ester and amide groups but which may or may not contain minor amounts of groups other than ester or amide groups, the ratio of the ester to the amide groups ranges from about 67:33 to about 97:3. As indicated above, these high ester content polyester-amides possess outstanding elastic properties. In behavior under stress certain compositions compare favorably with soft vulcanized rubber. The stretchability, softness and solubility of interpolymers prepared from a given set of reactants (diamine, dibasic acid and glycol) in various proportions approach a maximum at compositions containing a ratio of ester groups to amide groups greater than 2:1 and less than 32:1.

The above-mentioned properties of the ester-amide interpolymers of this invention are illustrated graphically by the accompanying drawing in which Fig. 1 is the elasticity curve of a polymer obtained from hexamethylenediamine, ethylene glycol, and adipic acid, the per cent recovery being plotted against the ester content in per cent of the polymer;

Fig. 2 is the hardness curve of the same polymer in which the ordinates corresponding to varying ester content represent hardness expressed in grams;

Fig. 3 is an elasticity curve drawn in the same manner as that of Fig. 1 for the polymer obtained from decamethylenediamine, glycol and sebacic acid; and Fig. 4 is the hardness curve drawn in the same manner as that of Fig. 2 for the polymer mentioned in Fig. 3.

In the above curves the cross mark indicates the composition at which the ratio of ester to amide groups corresponds to the previously mentioned value, namely, about 2 to 1. As shown by the curves the elastic recovery passes through a maximum and the hardness through a minimum. It will be apparent from this fact and from the further data given below in connection with polymers of the same type that the ester-amide interpolyamides of this invention possess unique and unexpected properties which cannot be inferred from the previously known ester or amide polymers, or from the known ester-amide interpolymers.

The following examples, in which the quantities of reagents are parts by weight, are illustrative of the preparation and application of the products of this invention. When the composition is expressed in percentage ester, the term applies to the weight of ingredients taken and not to the percentage of ester in the completely polymerized product.

EXAMPLE I

A mixture of 73.45 parts of hexamethylenediammonium adipate (the salt derived from hexamethylenediamine and adipic acid), 124.10 parts of ethylene glycol, 292.16 parts of adipic acid (ratio ester/amide 7.14) and 50 parts of water was heated for 2 hours at 150° C./atm., 8 hours at 200° C./atm., 5 hours at 250° C./20 mm., and finally 18 hours at 250° C./2 mm. A slow stream of nitrogen was bubbled through the mixture to cause agitation and to facilitate the removal of water. The product was a tough, transparent, elastic polymer, melting at 96° C. and having an intrinsic viscosity of 0.74. The interpolymer was soluble in esters, alcohols, ketones and related compounds, and in mixtures of alcohols, and chlorinated hydrocarbons. It could be melt spun into lustrous monofils which could be cold drawn and which, after cold drawing, exhibited a high degree of stretchability. The polymer could also be melt cast into transparent sheets whose toughness could be improved by cold rolling. Oriented films had a tensile strength of 7,840 lbs./sq. in. (17,660 lbs./sq. in. calculated on dimensions at break). The rubber-like properties of this interpolymer are most clearly demonstrated by the ease with which the films can be stretched and snapped in manual tests.

Following the general method described above, a number of other compositions were prepared by varying the proportions of the constituents. In this series of interpolymers, the melting points range gradually from that of the pure polyesters to that of the pure polyamide. Table I lists the melting points as determined on a metal block in air for the various fiber-forming interpolymers. The hardness curve for this series passes through a minimum near 85% ester (ratio ester/amide 7.14) as shown in Table I. Compositions high in ester content possess outstanding elastic properties. The stretchability approaches a maximum near 85% ester corresponding approximately to that composition at which minimum hardness occurs. The compositions high in ester content (above 70%) are soluble in a large variety of solvents such as alcohols, esters and ketones, whereas those low in ester content (below 50%) are soluble only in the usual phenolic polyamide solvents. Interpolymers high in the ester content, e. g., 80 to 95% ester, are unique in that they are more soluble than the corresponding pure polyesters or polyamides.

TABLE I

*Hexamethylenediamine-ethylene glycol-adipic acid interpolymers*

| Hexamethylene-diammonium adipate* | Ethylene glycol adipic acid* | Melting point, °C. | Hardness, grams | Ratio ester/amide |
|---|---|---|---|---|
| 5 | 95 | 64 | 50 | 23.8 |
| 10 | 90 | 80 | 11 | 11.4 |
| 15 | 85 | 96 | 8 | 9.1 |
| 20 | 80 | 110 | 18 | 5.1 |
| 30 | 70 | 140 | 25 | 2.9 |

*Parts by weight of initial ingredients.

EXAMPLE II

A mixture of 34.83 parts of hexamethylenediamine, 292.11 parts of pentaglycol 2,2-dimethyl-1,3-propanediol), 627.87 parts of sebacic acid (ratio ester/amide 9.3) and 40 parts of water was heated for 4 hours at 200° C./atm., 8 hours at 200° C./mm., and finally for 10 days at 250° C./2 mm. Throughout the entire heating period, a slow stream of nitrogen was bubbled through the mixture to cause agitation and to facilitate the removal of water. The product was a tough, transparent, rubber-like polymer, melting at 98° C. and having an intrinsic viscosity of 0.88. The interpolymer was soluble in nearly all the ordinary organic solvents, such as aromatic hydrocarbons, esters, alcohols, ketones, ethers, chlorinated hydrocarbons and related compounds, and in mixtures of alcohols and chlorinated hydrocarbons. Solvent cast and melt cast films showed a high degree of stretchability and drawability. The unusual rubber-like character of this interpolymer becomes apparent when it is stretched and snapped manually, the recovery being almost instantaneous.

Following the general procedure described above, several other compositions were prepared by varying the proportions of the ingredients mentioned. In this series of interpolymers the melting points lie between and approach, with change in composition, the melting point of the pure polyester or polyamide as shown in Table II. Rubberiness and softness increase with ester content so that the 95% ester composition closely resembles soft vulcanized rubber in elastic behavior and fully oriented films recover rapidly with snap from 600% stretch. Maximum softness, stretchability, and solubility in a wide variety of solvents appear near the 95% ester composition. In addition to their unusual solubility and elasticity, these interpolymers are in some cases compatible with cellulose nitrate, cellulose acetate and other cellulosic derivatives, thus making them especially valuable in the preparation of wrapping materials, coating compositions and safety-glass interlayers.

TABLE II

*Hexamethylenediamine-pentaglycol-sebacic acid interpolymers*

| Hexamethylene-diammonium sebacate* | Pentaglycol sebacic acid* | Melting point, °C. | Hardness, grams | Ratio ester/amide |
|---|---|---|---|---|
| 5 | 95 | 85 | 1 | 19.6 |
| 10 | 90 | 98 | 8 | 9.3 |
| 15 | 85 | 115 | 12 | 5.9 |
| 30 | 70 | 145 | 28 | 2.4 |

*Parts by weight of initial ingredients.

EXAMPLE III

A mixture of 19.65 parts of hexamethylenediammonium adipate, 33.95 parts of ethylene glycol, 77.50 parts of sebacic acid (ratio ester/amide 5.7) and 10 parts of water was heated for 3 hours at 150° C./atm., 4 hours at 200° C./atm., and finally 16 hours at 200° C./2 mm. The product obtained was a clear, transparent, tough polymer, melting at 100° C., and having an intrinsic viscosity of 0.59. Melt cast sheets could be cold rolled into films having a tensile strength of 7,510 lbs./sq. in. (14,900 lbs./sq. in. at break). The interpolymer was soluble in esters, alcohols, ketones and related compounds, and in mixtures of alcohols and chlorinated hydrocarbons.

Following the general method described above, several other compositions in this series were prepared from the ingredients mentioned. This series of interpolymers resembles in many respects the hexamethylenediamine-ethylene glycol-adipic acid series described in Example I. The melting points of the interpolymers lie between and approach with change in composition those of the pure polyester. The melting points of typical compositions falling within the range of this invention are shown in Table III. Compositions high in amide content (not a part of this invention) are soluble only in the usual polyamide solvents, whereas those high in ester content are soluble in a variety of solvents such as alcohols, esters and ketones. The hardness curve approaches a minimum near 85% ester corresponding approximately to that composition at which maximum elasticity occurs.

TABLE III

*Hexamethylenediammonium adipate-ethylene glycol-sebacic acid interpolymers*

| Hexamethylene-diammonium adipate* | Ethylene glycol sebacic acid* | Melting point, °C. | Hardness, grams | Ratio ester/amide |
|---|---|---|---|---|
| 10 | 90 | 92 | 54 | 8.9 |
| 15 | 85 | 100 | 30 | 5.7 |
| 20 | 80 | 115 | 42 | 4.0 |
| 30 | 70 | 128 | 63 | 2.3 |

*Parts by weight of initial ingredients.

EXAMPLE IV

A mixture of 6.87 parts of decamethylenediamine, 54.16 parts of ethylene glycol, 86.26 parts of adipic acid (ratio ester/amide 13.7) and 20 parts of water was heated for 3 hours at 150° C./atm., 4 hours at 200° C./atm., 8 hours at 200° C./2 mm., and finally for 16 hours at 250° C./2 mm. The product was a transparent, tough, rubbery polymer which melted at 70° C. and had an intrinsic viscosity of 0.45. Melt cast sheets were cold rolled to elastic films having a tensile strength of 6,020 lbs./sq. in. (14,150 lbs./sq. in. at break).

A number of other compositions were prepared using different proportions of the above ingredients. Like the series described in previous examples, the maximum softness, stretchability, and solubility again appear near the 85% ester composition.

TABLE IV

*Decamethylenediamine-ethylene glycol-adipic acid interpolymers*

| Decamethylene-diamine adipic acid* | Ethylene glycol adipic acid* | Melting point, °C. | Hardness, grams | Ratio ester/amide |
|---|---|---|---|---|
| 10 | 90 | 72 | 18 | 13.7 |
| 15 | 85 | 80 | 10 | 8.7 |
| 20 | 80 | 94 | 20 | 6.1 |
| 30 | 70 | 112 | 40 | 3.4 |

*Parts by weight of initial ingredients.

EXAMPLE V

A mixture of 5.81 parts of hexamethylenediamine, 20.93 parts of ethylene glycol, 79.35 parts of sebacic acid (ratio ester/amide 6.9) and 10 parts of water was heated for 3 hours at 150° C./atm., 8 hours at 200° C./atm., 4 hours at 200° C./2 mm., and finally for 6 hours at 250° C./2 mm. The product was a tough, transparent polymer which melted at 110° C. and had an intrinsic viscosity of 0.70. Oriented films had a tensile strength of 6,230 lbs./sq. in. (19,000 lbs./sq. in. at break).

Following the same general procedure, a number of other compositions were prepared by using different proportions of the constituents mentioned above; namely, hexamethylenediamine, ethylene glycol and sebacic acid. Table V gives the melting points for fiber-forming polymers prepared from these ingredients. The hardness for this series of interpolymers passes through a minimum near 70% ester corresponding approximately to that composition at which maximum elasticity occurs.

TABLE V
*Hexamethylenediamine-ethylene glycol-sebacic acid interpolymers*

| Hexamethylene-diamine sebacic acid* | Ethylene glycol sebacic acid* | Melting point, °C. | Hardness, grams | Ratio ester/amide |
|---|---|---|---|---|
| 5 | 95 | 76 | 80 | 22.7 |
| 15 | 85 | 110 | 80 | 6.9 |
| 30 | 70 | 138 | 60 | 2.8 |

*Parts by weight of initial ingredients.

EXAMPLE VI

A mixture of 17.22 parts of decamethylenediamine, 20.44 parts of ethylene glycol, 87.03 parts of sebacic acid (ratio ester/amide 3.8) and 10 parts of water was heated for 3 hours at 150° C./atm., 3 hours at 200° C./atm., 12 hours at 200° C./2 mm., and finally for 12 hours at 250° C./2 mm. The product thus obtained was a tough, fiber-forming polymer which melted at 128° C. and had an intrinsic viscosity of 0.59. Oriented films had a tensile strength of 7,260 lbs./sq. in. at break. The interpolymer was soluble in hot solvents such as isobutanol, cyclohexanol, cellosolve and ethylene chlorohydrins.

A number of other compositions were prepared by using different proportions of the above ingredients. The melting points increased gradually as the percentage of amide ingredients was increased as shown in Table VI. The hardness curve for this series passes through a minimum near 70% ester which corresponds also with the region of maximum elasticity.

TABLE VI
*Decamethylenediamine-ethylene glycol-sebacic acid interpolymers*

| Decamethylene-diamine sebacic acid* | Ethylene glycol sebacic acid* | Melting point, °C. | Hardness, grams | Ratio ester/amine |
|---|---|---|---|---|
| 5 | 95 | 90 | 62 | 27.0 |
| 15 | 85 | 101 | 60 | 8.0 |
| 30 | 70 | 124 | 50 | 3.3 |

*Parts by weight of intial ingredients.

It is to be observed, in order to obtain the products of this invention, that the heating at reaction temperature must be continued until the stage at which a high molecular weight polymer is obtained, this stage being determined by examination of the intrinsic viscosity of the resulting product or by the test previously mentioned of touching the molten mass with a glass rod and drawing a filament from the mass. The importance of heating the reactants until they exhibit fiber-forming properties is illustrated by the following example in which part (A) shows the preparation of the present polymer and part (B) shows the product obtained by heating the same reactant in the same ratio for a time less than in part (A).

EXAMPLE VII (A) In producing a fiber-forming polyester-amide (85% ester with a ratio ester/amide 5.7) by the preferred procedure, a mixture of 4.50 parts of ethylenediamine, 26.12 parts of ethylene glycol, 72.46 parts of adipic acid and 10 parts of water was heated for 3 hours at 150° C./atm., 4 hours at 200° C./atm., 8 hours at 200° C./20 mm., and finally for 48 hours at 200° C./2 mm. The resulting product was a transparent, tough, rubbery polymer which was insoluble in Hi-flash naphtha or xylene. It melted at 94° C., had an intrinsic viscosity of 0.41, and could be cast and rolled into an oriented film which had a tensile strength of 5,100 lbs./sq. in. at break. The partially oriented film had a high degree of stretchability and rubberiness.

(B) An interpolymer was prepared by methods disclosed in U. S. Patent 2,048,778 using the same ratio (ratio ester-amine 5.7) of ingredients as in the above (A). A mixture of 26.12 parts of ethylene glycol and 72.46 parts of adipic acid was heated 1 hour at 200° C./atm. During a one-half hour period, 4.50 parts of ethylenediamine was introduced and then the mixture was heated for an additional 12 hours at 200° C./atm. with a slow stream of nitrogen passing through to cause agitation. The product was a soft, white, wax which melted near 55° C., and was soluble in Hi-flash naphtha and xylene. It had an intrinsic viscosity of 0.10, possessed no fiber-forming properties, and could not be cast into unsupported films.

The preferred reactants for making the polymers of this invention are as follows:

Diamines of formula $NH_2$—R—$NH_2$, where R represents a saturated divalent hydrocarbon radical with a chain length of at least two carbon atoms. An especially valuable group of diamines are those in which R is a polymethylene radical $(CH_2)_x$ where $x$ is at least two. As examples of diamines which fall within this group might be mentioned ethylenediamine, tetramethylenediamine, pentamethylenediamine, hexamethylenediamine, decamethylenediamine, and para-xylylene diamine. However, aromatic diamines such as m-phenylenediamine and benzidine and hydroaromatic diamines may also be used. As indicated in the examples it is convenient to use the diamine in the form of its salt with the dibasic acid to be used in making the interpolymer.

Dibasic acids of formula HOOC—R'—COOH, where R' represents a saturated divalent hydrocarbon radical with a chain length of at least four carbon atoms. As examples might be mentioned adipic, pimelic, sebacic, diphenic, and the $C_{11}$ and $C_{12}$ dibasic acids obtained by the oxidation of hydrogenated castor oil. The interpolymers may be prepared either from the acid or from some suitable amide-forming or ester-forming derivative of the acids, such as the esters, half-esters, anhydrides, amide, or acyl chlorides. The term "dibasic carboxylic acid" as used in the claims includes such derivatives of the acids.

As glycols may be mentioned ethylene glycol, propylene glycol, pentaglycol, trimethylene glycol, hexamethylene glycol, decamethylene glycol. In addition aromatic, hydroaromatic or aromatic aliphatic dihydric alcohols may be used.

The invention is not limited to ester-amide interpolymers derived from a single diamine, glycol, and dibasic acid. A plurality of each or all of these three reactants may be used.

It will be understood that various modifying agents such as plasticizers, pigments, resins, etc., may be included with the products of this invention by adding such agents before, during, or after the polymerization reaction.

It is to be observed that the time of reaction in preparing the fiber-forming ester-amide interpolymers of the present invention is very much shorter and does not require a molecular still or special procedure as in the case of the fiber-forming polymers previously prepared. The interpolymers of the present invention, as compared to the known polymers just mentioned, show a remarkable degree of stretchability or rubber-like character. They also differ markedly in several other properties, as for instance hardness, solubility and elasticity.

As many apparently widely different embodiments of this invention may be made without departing from the spirit and scope thereof, it is to be understood that we do not limit ourselves to the specific embodiments thereof except as defined in the appended claims.

We claim:

1. A process which comprises heating at reaction temperature a reaction mixture obtained from a diamine containing at least one hydrogen atom on each amino nitrogen atom, a dibasic carboxylic acid and a glycol in amounts such that the resultant product contains more than two ester groups for each amide group, and continuing said heating until filaments formed from the polymer are capable of being cold drawn into fibers showing by characteristics X-ray patterns orientation along the fiber axis.

2. A process which comprises heating at reaction temperature an aqueous solution of a reaction mixture obtained from a diamine containing at least one hydrogen atom on each amino nitrogen atom, a dibasic carboxylic acid and a glycol in amounts such that the resultant product contains more than two ester groups for each amide group, removing the water, and continuing said heating until filaments formed from the polymer are capable of being cold drawn into fibers showing molecular orientation along the fiber axis.

3. The process for preparing fiber-forming polymers which comprises heating a mixture comprising a diprimary diamine, a dibasic carboxylic acid and a glycol at 150 to 250° C., with removal of the by-product of the reaction, until the resultant polymer has an intrinsic viscosity of at least 0.4, said glycol and diamine being used in a molar ratio greater than 2:1 and less than 32:1, and said dibasic carboxylic acid being used in amount substantially chemically equivalent to the sum of the glycol and diamine.

4. The process of claim 3 in which said diamine is hexamethylenediamine, said dibasic acid is adipic, and said glycol is ethylene glycol.

5. The process of claim 3 in which said diamine is hexamethylenediamine, said dibasic acid is sebacic, and said glycol is ethylene glycol.

6. A synthetic linear ester-amide interpolymer substantially identical with that formed in the process of claim 1, wherein the capacity of filaments formed therefrom, for being cold drawn into fibers showing by characteristic X-ray patterns orientation along the fiber axis, is attained by the continuation of the heating step of claim 1 for the period specified therein.

7. A synthetic linear ester-amide interpolymer substantially identical with that formed in the process of claim 2, wherein the capacity of filaments formed therefrom, for being cold drawn into fibers showing by characteristic X-ray patterns orientation along the fiber axis, is attained by the continuation of the heating step of claim 2 for the period specified therein.

8. An interpolymer substantially identical with that formed in accordance with claim 3, wherein the diamine is hexamethylene diamine, the dibasic carboxylic acid is adipic acid, the glycol is ethylene glycol, and the said intrinsic viscosity of at least 0.4 is attained by the continuation of the heating step of claim 6 for the period specified therein.

9. An interpolymer substantially identical with that formed in accordance with claim 3, wherein the diamine is hexamethylene diamine, the dibasic carboxylic acid is sebacic acid, the glycol is ethylene glycol, and the said intrinsic viscosity of at least 0.4 is attained by the continuation of the heating step of claim 3 for the period specified therein.

MERLIN MARTIN BRUBAKER.
ROBERT EDWARD CHRIST.
DONALD DRAKE COFFMAN.